US011760305B2

(12) United States Patent
Thomas et al.

(10) Patent No.: US 11,760,305 B2
(45) Date of Patent: Sep. 19, 2023

(54) RELAY ATTACK PREVENTION

(71) Applicant: NAGRAVISION S.A., Cheseaux-sur-Lausanne (CH)

(72) Inventors: Frédéric Thomas, Cheseaux-sur-Lausanne (CH); Joël Conus, Cheseaux-sur-Lausanne (CH)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 89 days.

(21) Appl. No.: 17/552,425

(22) Filed: Dec. 16, 2021

(65) Prior Publication Data

US 2022/0194316 A1 Jun. 23, 2022

(30) Foreign Application Priority Data

Dec. 23, 2020 (EP) .................................... 20217102

(51) Int. Cl.
*B60R 25/20* (2013.01)
*B60R 25/04* (2013.01)
*B60R 25/24* (2013.01)
*G07C 9/00* (2020.01)

(52) U.S. Cl.
CPC .......... *B60R 25/2072* (2013.01); *B60R 25/04* (2013.01); *B60R 25/24* (2013.01); *G07C 9/00309* (2013.01); *B60R 2325/101* (2013.01); *G07C 2009/00325* (2013.01); *G07C 2009/00507* (2013.01); *G07C 2009/00555* (2013.01); *G07C 2009/00769* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 10,723,317 B2 * | 7/2020 | Saleh | .................... B60R 25/246 |
| 2018/0162321 A1 | 6/2018 | Spiess | |
| 2019/0073846 A1 | 3/2019 | Kamkar et al. | |
| 2020/0005571 A1 | 1/2020 | Han et al. | |
| 2020/0198580 A1 | 6/2020 | Saleh et al. | |

* cited by examiner

*Primary Examiner* — K. Wong
(74) *Attorney, Agent, or Firm* — HOYNG ROKH MONEGIER B.V.; David P. Owen

(57) ABSTRACT

Passive entry systems, such as passive entry-passive start vehicle systems, using short-range wireless communication signals to determine a distance between nomadic devices and unlockable devices based on a round trip time of flight (TOF) measurement.

18 Claims, 6 Drawing Sheets

RELAY ATTACK PREVENTION

TECHNICAL FIELD

The present disclosure generally relates to passive entry systems, such as passive entry-passive start vehicle systems. The present disclosure particularly relates to software applications, nomadic devices, vehicles, and systems using short-range wireless communication protocols to determine a distance between a nomadic device and an unlockable device such as a vehicle, based on a round trip time of flight measurement.

BACKGROUND

Passive keyless entry is a vehicle security system that operates automatically when the user is in proximity to the vehicle, unlocking the door on approach or when the door handle is pulled and locking it when the user walks away. A passive keyless entry device can operate while stored in the user's pocket or handbag, unlike a standard remote keyless entry device, which requires the user to hold the device and push a button to lock or unlock the vehicle. Passive keyless entry systems typically involve a radio frequency key fob designed for passive keyless entry.

Key fob and a vehicle module both contain transceivers that communicate wirelessly to detect each other. The module in the vehicle continually sends out encoded messages; when the key fob is in range it responds. If the encrypted messages are correct, they identify the vehicle and key fob to each other and doors opens.

Vehicles that are designed for passive keyless entry often feature keyless ignition start as well, which simply requires the driver to push a button. This combination is called passive entry-passive start.

It has been discovered that some passive entry-passive start systems can be deceived using a two-transceiver method commonly called a "relay attack". The method deceives the vehicle security system by relaying the request-reply communications without the owner's knowledge. One relay device is located close to the vehicle and a second relay device is positioned close to the vehicle's owner carrying a passive entry key fob. Then, in response to, for example, pulling a door handle, the first relay device receives a request signal transmitted by the vehicle security system, and relays the information to the second relay device. The second relay device retransmits the signal to the passive entry key fob. The key fob will automatically reply to this retransmitted signal which is relayed back to the vehicle to unlock the door.

Mobile phones have also been designed for passive keyless entry. Similar to key fobs, however, the radiofrequency exchange between phone and vehicle is subject to relay attacks. A suitable send and receive system can be used by attackers to bridge the distance between the phone (e.g. in the user's home) and the car (e.g. parked on the street). The car detects and authenticates the phone as if it was next to the car.

Therefore, it is desirable to provide new methods and devices that prevent or reduce risk of relay attack.

It is desirable to provide software applications for mobile devices and for vehicles that thwart relay attack.

It is also desirable to provide passive entry-passive start systems that thwart and/or detect relay attack.

The present disclosure provides such software applications, devices, systems and methods that solve one or more of the problems mentioned above. Other features and advantages will be apparent from the following description and from the claims.

BRIEF DESCRIPTION OF THE DRAWINGS

The features and advantages of the disclosure will be appreciated upon reference to the following drawing, in which.

Figure 1:
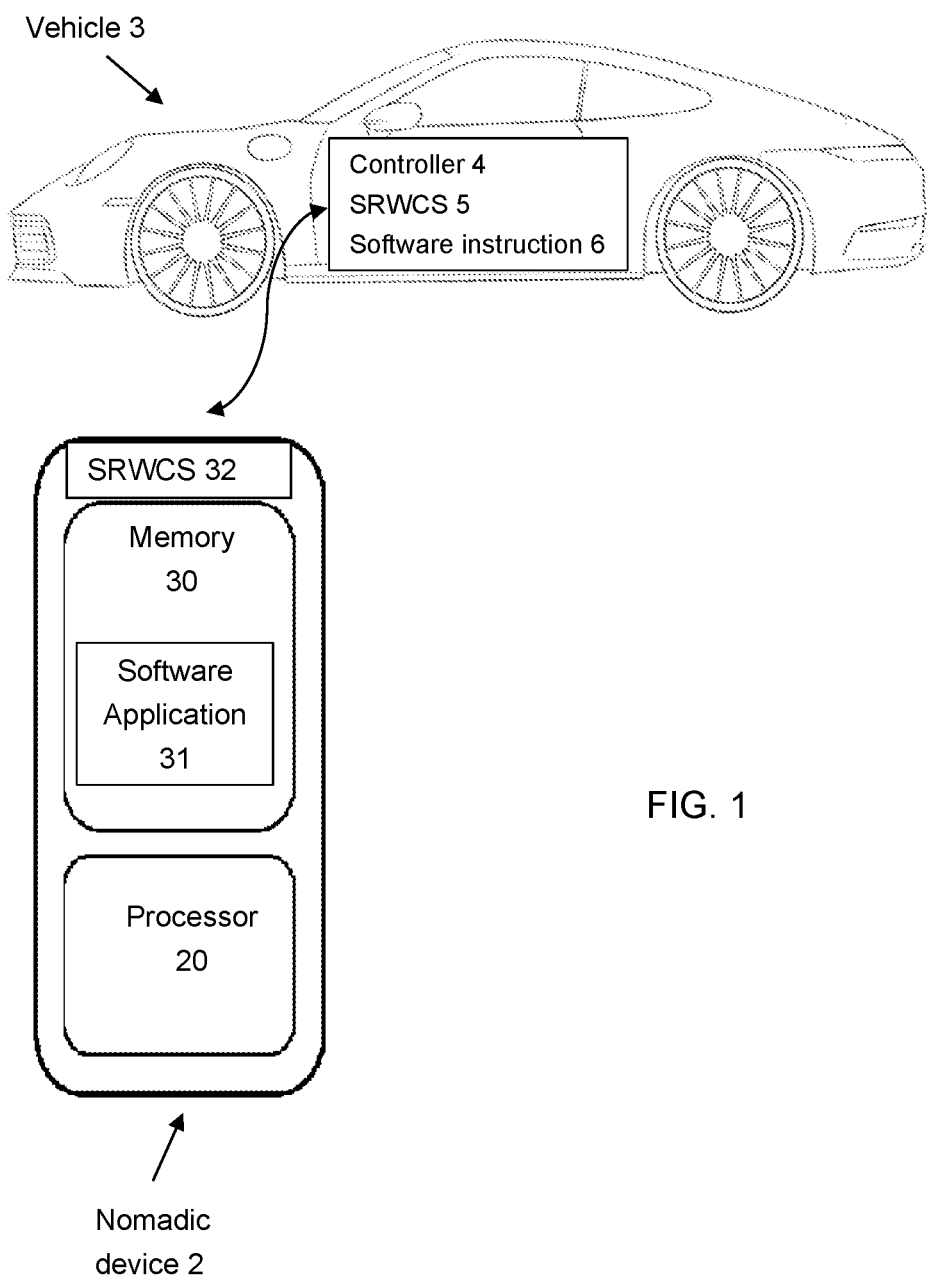
FIG. 1 illustrates an exemplary passive entry-passive start system in accordance with an embodiment of the present disclosure.

The figures are meant for illustrative purposes only, and do not serve as restriction of the scope or the protection as laid down by the claims.

DESCRIPTION OF ILLUSTRATIVE EMBODIMENTS

While the present disclosure may be embodied in various forms, there are shown in the drawings, and will hereinafter be described, some exemplary and non-limiting embodiments, with the understanding that the present disclosure is to be considered an exemplification of the disclosure and is not intended to limit the disclosure to the specific embodiments illustrated.

Example devices, software applications and methods disclosed herein include a system that thwarts and/or detects attempted relay attacks on communication between a nomadic device (e.g., smart phone, smart watch, or any other nomadic device configured to unlock and possibly lock an unlockable device in accordance with the present disclosure) and an unlockable device that may be unlocked and possibly locked using the nomadic device. In the following an unlockable device in the form of a vehicle will be described, but it will be understood that the present disclosure is not limited to such vehicle and may be applied to other unlockable devices, such as entry systems to buildings, electronic locks on doors, vessels, aircrafts, and etcetera.

The nomadic device may be used in conjunction with a vehicle and may prevent access entry to a vehicle and/or ignition of a vehicle engine upon detection of an attempted relay attack. Examples disclosed herein utilize short-range wireless communication protocol (e.g. Bluetooth® low-energy (BLE) communication) to detect a distance between a vehicle and a nomadic device communicatively coupled to the vehicle based upon a time-of-flight of the short-range wireless communication signal between the nomadic device and the vehicle.

A relay attack may be prevented by measuring the round trip time-of-flight (ToF) for a signal to travel from a vehicle's short-range wireless communication system to a nomadic device's short-range wireless communication system and back to the vehicle. The round trip ToF can be used to determine a distance between the vehicle and the nomadic device. By accurately determining the distance between the vehicle and the nomadic device, actions such as unlocking the vehicle doors by a relay attack can be prevented as it can be determined if the vehicle owner carrying the nomadic device is further away from the vehicle than a predetermined distance.

To determine the distance between the nomadic device and the vehicle, a signal data (packet) may be transmitted between them. The time required for the packet to travel from the vehicle to the nomadic device (or from the nomadic device to the vehicle) and back is called the round trip time (RTT). The distance the packet traveled can be obtained by multiplying RTT with the speed of light (c), leading to the following formula for the distanced (d) between the vehicle and the nomadic device: d=c*RTT/2. It should be appreciated that the distance according to present disclosure is based on the distance between short-range wireless communication transceivers of the vehicle and the nomadic device.

Nomadic devices are typically heterogenous in a way they operate in terms of timing. The heterogeneity of nomadic computing devices reside in both hardware and software aspects. The increasing variety of hardware components being mounted on nomadic devices such as smart phones results in fundamental difference in the drivers, I/O stacks, and data access being used by these hardware. Even for the same type of hardware, access time to the hardware data is typically different if the hardware drivers are provided by different manufactures. Furthermore, complexity and increasing amount of software applications and operating systems running on nomadic devices typically leads to heterogeneity in their specific ways of accessing and processing the data. Thus, heterogeneity of the nomadic devices influences measurement of RTT and thus calculation of the distance between the vehicle and the nomadic device.

Present disclosure takes advantage of heterogeneity of nomadic devices and provides a software application, configured to run on nomadic devices, to identify a nomadic device based on its heterogenous aspect. The software application of present disclosure may identify a nomadic device and may generate a fingerprint for the nomadic device. Herein, the fingerprint may be based on the ToF of a signal between the nomadic device and the unlockable device. By identifying a fingerprint for a nomadic device, the passive entry-passive start systems of present disclosure can distinguish between the vehicle's owner nomadic device and attacker's relay device before performing a function such as unlocking vehicle doors and/or starting the ignition. Thus, relay attacks on communication between the nomadic device and a vehicle can be detected and prevented.

An executable program may be loaded onto a mobile telephone that allows it to function as a proximity-based hands-free (passive) remote controller. In this example, a remote keyless system will detect the presence of the mobile telephone using, for example, Bluetooth® protocols, whereas the embodiments described above typically require some action on the part of the user (e.g., pressing a button or touching the mobile phone screen) to control the remote keyless system. If the mobile telephone is properly equipped with an executable program in accordance with the present disclosure that identifies the mobile telephone owner as a person authorized to access the system, it may allow said owner to manipulate the functions it controls. For example, if a remote keyless system recognizes a mobile telephone in accordance with the present disclosure, and the owner of the vehicle may pull on a door handle of a locked door connected to the system, the remote keyless system may unlock the door before the door handle has been fully actuated, allowing the mobile telephone owner access to the door.

In an example, a passive entry vehicle security system may be configured to thwart a relay attack on the system is provided. The system may include a first Bluetooth® low energy (BLE) transceiver, a mobile BLE transceiver, and a controller. The first BLE transceiver may be installed on a vehicle and may be configured to transmit a request pulse at a request time. The mobile BLE transceiver may be installed in a nomadic device and may be configured to transmit a reply pulse in response to the request pulse. The controller may be configured to determine a distance between the first BLE transceiver and the mobile transceiver based on a time interval between the request time and a time that corresponds to when the reply pulse is received by the first BLE transceiver. The controller may further be configured to unlock doors of the vehicle only if the distance is less than an unlock threshold.

In an example, a passive entry vehicle security controller configured to thwart a relay attack on a passive entry vehicle security system is provided. The controller may include a processor configured to operate a Bluetooth® low energy (BLE) transceiver to determine a distance between a first Bluetooth® low energy (BLE) transceiver and a mobile BLE located apart from the controller, said distance based on a time interval between a request time that corresponds to when the first BLE transceiver transmits a request pulse, and a time that corresponds to when the reply pulse is received by the first BLE transceiver.

To identify and to generate a nomadic device's fingerprint, the software application of present disclosure, which is configured to run on a nomadic device, provides at least two timestamps indicating time values when the software application receives and transmits a short-range wireless communication signal within the nomadic device. As mentioned above, these time values are typically influenced by heterogeneity of a specific nomadic device, for example, by hardware configurations and running software applications on the nomadic device. For example, a smart phone having more running software applications or slower processing cores, generates different time stamps than another smart phone with stronger processing cores or less running applications. The software application of present disclosure generates and broadcasts these time values to the passive entry-passive start systems of the vehicle according to the present disclosure to prevent and/or detect relay attack.

The time values need not be unique and may for example include a bit of jitter (e.g. due to multi-threading, and etcetera). The time values may be used to make the RTT more deterministic by removing a non-deterministic processing time within the device.

The fingerprint of a nomadic device may be determined from the RTT and taking into account the time values, from which a delta processing time that is left once e.g. the jitter of an app (based on the time values) has been subtracted from the RTT.

In addition, these time values may be used to more accurately calculate the distance between a nomadic device and a vehicle based upon a time-of-flight of the short-range wireless communication signal between the nomadic device and the vehicle. By accurately determining distance between the vehicle and the nomadic device, more accurate distance thresholds can be set in the keyless passive entry-passive start systems to prevent and/or detect relay attacks.

Furthermore, present disclosure provides software instructions configured to run on a vehicle in order to improve functionality of vehicles passive entry-passive start system. A controller, which is a computing platform of the vehicle having, at least, a software instruction, determines, via one or more processors, a distance based upon a time-of-flight of the short-range wireless communication signal between the nomadic device and the vehicle utilizing the timestamps generated by a nomadic device software application. In some examples, the controller initiates a short-range wireless communication protocol (e.g. Bluetooth® low-energy (BLE) communication) in response to receiving of a vehicle entry request (e.g., via, a passive entry signal, a door handle sensor, crossing the threshold of an approach detection zone, etc.) and/or an engine ignition request.

Turning to the figures, FIG. 1 illustrates an example of a system 1 and that can be used to implement methods disclosed herein. System 1 generally includes one or more nomadic devices (2) (e.g. smart phone) and an unlockable device (3) (e.g. vehicle). It should be understood that any number of different systems can be used and is not specifically limited to the system shown here. For example, the system 1 can comprise a backend system (not shown), and a land communication network (not shown).

Vehicle 3 includes any vehicle such as a passenger car, a motorcycle, a truck, a sports utility vehicle (SUV), a recreational vehicle (RVs), a marine vessel, an aircraft, a gasoline powered vehicle, a hybrid vehicle, an electric vehicle, etc.

Nomadic device may be electronically coupled to the vehicle 3 wirelessly via short-range wireless communication protocol (e.g., Wi-Fi, Bluetooth®, Bluetooth® Low Energy (BLE), Near-Field Communication (NFC), etc.). The nomadic device may communicate via cellular communication, short-range wireless communication protocols, or a combination thereof.

By way of example and not limitation, the nomadic devices according to the present disclosure include any handheld wireless device. For example, any handheld wireless device that an operator (not shown) of the vehicle 3 carries on his or her person. The nomadic device may be a smart phone, smart watch, a computing wearable device, a tablet, a portable wireless transceiver, a key fob, mobile electronic devices, a personal laptop computer or tablet computer having two-way communication capabilities, a netbook computer, a personal digital assistant (PDA) or any other type of mobile device that include a short-range wireless communication system such as but not limited to BLE.

Nomadic devices of present disclosure (e.g. nomadic device 2) may include a user interface coupled to one or more processors 20 which are configured to at least execute an operating system (OS) stored on device memory 30 (e.g., on a non-transitory computer readable medium of the device). It will be understood that instead of an OS a bare-metal program may be used that is programmed to perform the specific tasks of the nomadic device. The one or more processors 20 execute at least a software application 31 stored in device memory as well. The software application 31 may be part of the OS or bare-metal program. As shown in FIG. 1, vehicle 3 and nomadic device 2 can communicate with each other via their a short-range wireless communication systems 32 and 5 (SRWCS).

Using software application 31, a vehicle user wirelessly controls or communicates with vehicle 3. It should be appreciated that any suitable nomadic device (e.g., including but not limited to device 2) may comprise a similar processor, memory, software application, etc.

In one embodiment, software application 31 may enable the user to remotely lock/unlock vehicle doors, turn the vehicle on/off, alarming the vehicle user, and/or requiring input and verification from the user.

Thus, according to one embodiment, software application 31 performs at least some of the method steps and functions described herein—e.g., providing first timestamp and second timestamp of a nomadic device to a controller 4 of the vehicle 3 to determine, via a software instruction 6, the distance of a vehicle to a nomadic device based upon a time-of-flight of the short-range wireless communication signal between the nomadic device and the vehicle as will be described in greater detail below.

In another example the first timestamp and the second time stamp may be processed in the nomadic device before being provided to the vehicle 3, e.g. by subtracting the first time stamp from the second time stamp. The subtraction result may then be provided to the controller 4.

The nomadic device may comprise one or more processors; memory, operatively coupled to the one or more processors; a short-range wireless communication system, operatively coupled to the one or more processors; a non-volatile storage device, having a software application stored therein, configured upon execution by one or more processors, to enable the nomadic device generate a first timestamp corresponding to a time value based on a short-range wireless communication signal that reaches the software application from the short-range wireless communication system of the nomadic device, and generate a second timestamp corresponding to a time when the software application transmits the short-range wireless communication signal to one or more component of the mobile device.

Figure 2:
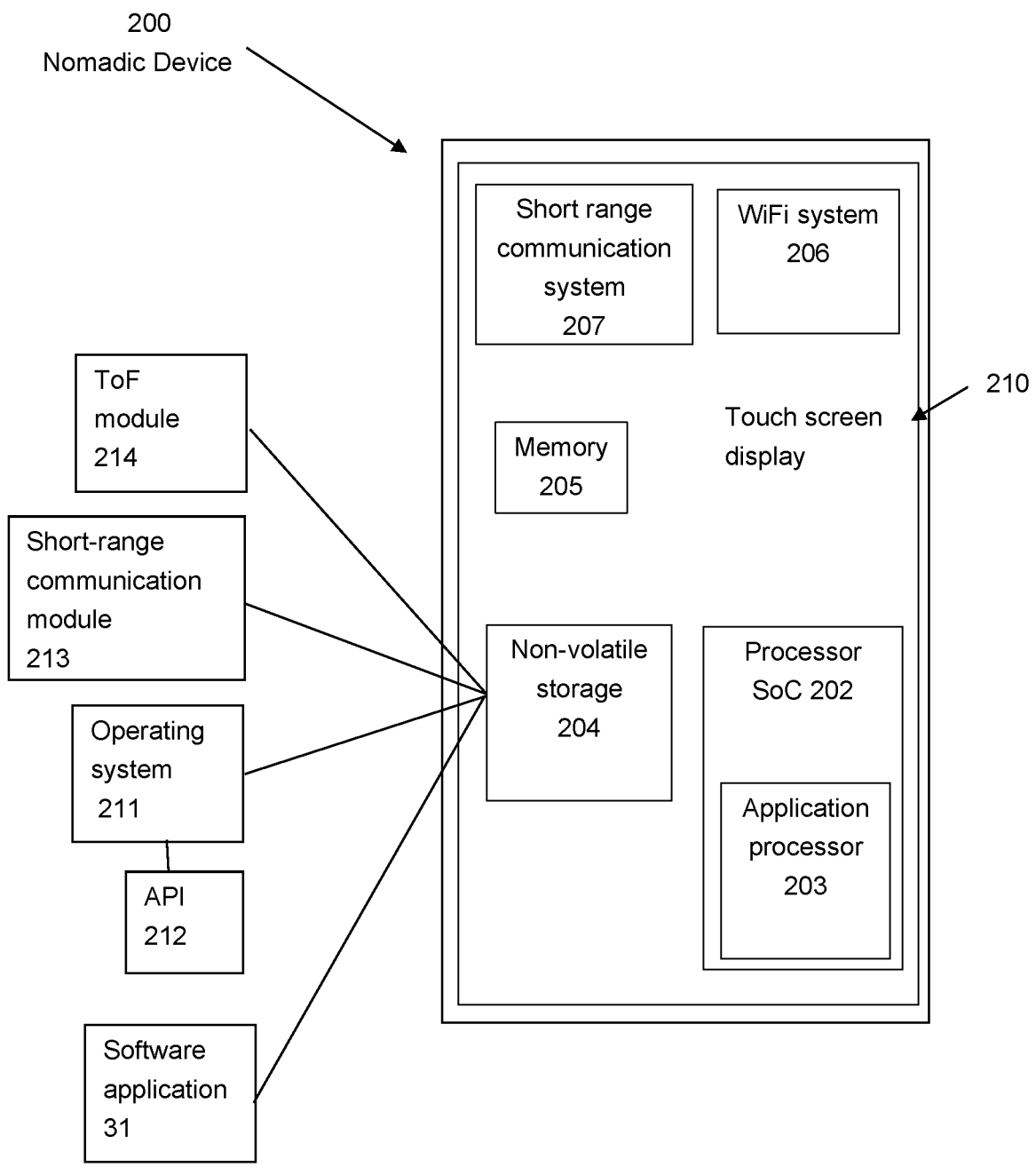
FIG. 2 illustrates an exemplary nomadic device having variety of components in accordance with an embodiment of present disclosure.

FIG. 2 shows an exemplary nomadic device, (e.g. a mobile device) 200 that includes a software application 31 to carry out a method of present disclosure.

Nomadic device 200 may include a processor system on a chip (SoC) 202 including an application processor 203 that includes one or more cores. Processor SoC 202 may be operatively coupled to non-volatile storage 204, memory 205, Wi-Fi system 206, and a short-range wireless communication system 207 (e.g. BLE system), the latter two of which may be coupled to one or more antennas (not shown). The nomadic device may include a touch screen display 210 comprising a liquid crystal display screen, or other type of display screen. Display screen 210 may be configured as a touch screen through use of any type of touch screen technology.

The software application 31 and modules such as an operating system 211 including API(s) 212, a short-range wireless communication module 213 (e.g. BLE module), a ToF module 214 may be loaded from non-volatile storage 204 into memory 205 for execution on one or more processing cores on processor SoC 202. For example, the software instruction 31 and modules are stored in non-volatile storage 204, which may comprises any type of non-volatile storage device. Generally, operating system 211 may comprise any existing or future operating system, including but not limited to APPLE® iOS, GOOGLE® ANDROID, MICROSOFT® WINDOWS and various Linux operating systems. The API(s) 212 vary by operating system.

The short-range wireless communication module 213 may include instructions for configuring its system 207. Optionally, the nomadic device includes a ToF module 214 having instructions for implementing operations related to usages of ToF to determine the distance of the nomadic device to a vehicle according to present disclosure. Optionally, a portion of the ToF module functionality may be implemented in a short-range wireless communication system 207.

According to one aspect of the present disclosure, a software application configured to run on a nomadic device such as a mobile device is provided. The software application comprises computer program code that when executed by one or more processors of the nomadic device performs a method comprising generating a first timestamp corresponding to a time value based on a short-range wireless communication signal that reaches the mobile software application from a short-range wireless communication system of the mobile device, and generating a second timestamp corresponding to a time when the mobile software application transmits the short-range wireless communication signal to one or more component of the mobile device such as a short-range wireless communication system of the mobile device.

Figure 3:
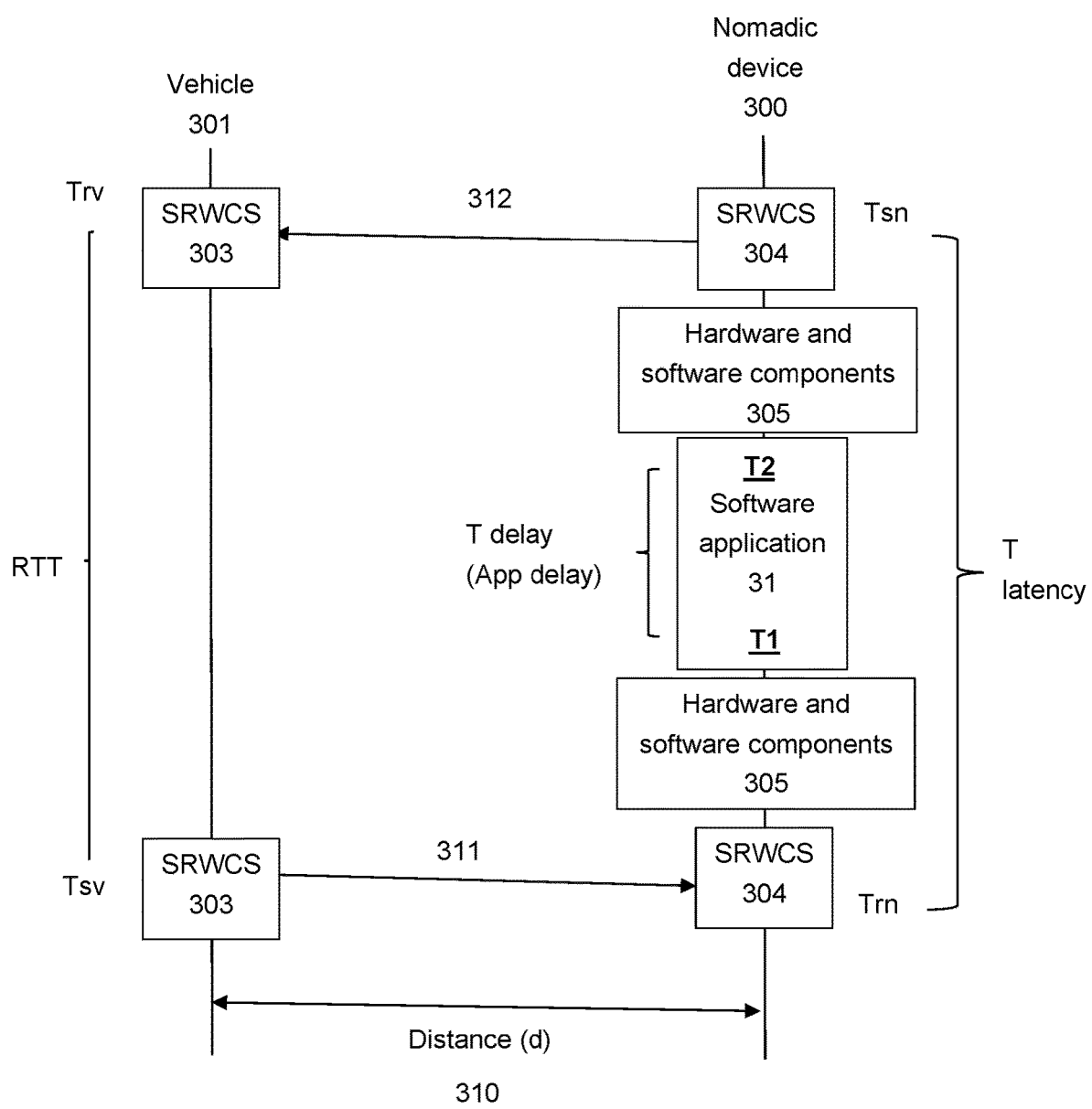
FIG. 3 illustrates an exemplary sequence diagram of the passive entry-passive start system in accordance with an embodiment of present disclosure.

FIG. 3 shows a diagram of an example operation involving a nomadic device (e.g., mobile device such as smartphone) 300 having a software application 31, a short-range wireless communication system (SRWCS) 304 (e.g. BLE system) and other software/hardware components 305 and a vehicle 301 having a short-range wireless communication system (SRWCS) 303 (e.g. BLE system) according to embodiments of the present disclosure. In this example of FIG. 3, the vehicle 301 broadcasts a packet that is received by a short-range wireless communication system 304 of a nomadic device (e.g. BLE system). Alternatively, (although not shown in FIG. 3) nomadic device 300 may broadcast a packet that is received by a short-range wireless communication system on a vehicle.

FIG. 3 shows a short-range wireless communication signal 311 sent at Tsv (Time sent by vehicle) and being received at a short-range wireless communication system 304 of the nomadic device at time Trn (Time received by nomadic device). The software application 31 of the nomadic device 300 generates a first timestamp T1 corresponding to a time value based on a short-range wireless communication signal that reaches the software application 31 from a short-range wireless communication system 304 of the nomadic device. The software application 31 also generates a second timestamp T2 corresponding to a time when the mobile software application transmits the short-range wireless communication signal to one or more component of the mobile device (e.g. a short-range wireless communication system 304 of the nomadic device).

The short-range wireless communication system 304 of the nomadic device provides a response 312, which are sent at time Tsn (lime sent by nomadic device. Vehicle 301 receives the response at time Trn (Time received by vehicle. Optionally, distance information 310 may be measured by the vehicle (e.g. by a controller having a software instructions and one or more processors, not shown in FIG. 3) and, optionally, sent to the nomadic device. Timestamps Trn, Tsn, T1 and T2 are, optionally, stored or tracked by one or more components of the nomadic device 300 and, optionally, sent to at least one of the short-range wireless communication system 303 of the vehicle or another component of the vehicle such as ToF module, so that the vehicle can determine the distance from the nomadic device.

As shown in FIG. 3, there may be a software application processing delay, depicted as T delay (App delay), that is incurred between when a short-range wireless communication signal received at T1 and transmitted at T2 by the software application 31. As explained above, heterogeneity of the nomadic devices due to for example variety of hardware and software components 305 influences T1 and T2. Thus, the time values T1 and T2 or the T delay (T delay obtains by subtracting T1 from T2, i.e. T2-T1) may be used to obtain a fingerprint of the particular nomadic device.

It may be important to accurately measure a distance d between the nomadic device and the vehicle in order to prevent and/or detect relay attack. Heterogeneity of nomadic devices such as mobile phones causes delay in processing (e.g. receiving and sending) signals from the nomadic device to the vehicle and therefore causes errors in measurement of RTT and distance. By measuring time values T1 and T2 or T2-T1, the processing delay caused by the heterogeneity of the nomadic device can be identified and taken into consideration, in order to obtain a more accurate RTT and distance measurements.

Generally, the distance d may be calculated as d=c*((RTT-(Tsn-Trn))/2), or presented differently as d=c*((RTT-T latency)/2). Herein, T latency includes the T delay caused by the heterogeneity of the nomadic device 300. The fingerprint of the nomadic device 300 may be determined as (Tsn-T2)±(T1-Trn) or (Tsn-Trn)-(T delay), i.e. a T latency that is corrected for the heterogeneity of the nomadic device 300.

The fingerprint may be determined in a calibration process initially performed by the user or owner of the unlockable device, such as the vehicle. In an example, the calibration may be performed by the user sitting in the vehicle and launching a calibration procedure in the app 31 (the user may be asked to sit in the driver seat when performing the calibration procedure). It may be assumed that when the person is sitting in the driver seat, the nomadic device will be roughly at a 1 meter distance from the vehicle's antenna. This means that the ToF is about 3.3 ns (6.6 ns round-trip). Several measurements of the RTT may be performed. These measurements will typically have different values due to the processing time jitter in the phone. T delay (T2-T1) may be subtracted from those measurements to remove the processing jitter from the app as well as the 6.6 ns RTT that represents the physical ToF. We are left with jitter and/or other potential overhead induced by the OS, driver, etc. This represents the ((Tsn-T2)+(T1-Trn)) fingerprint value mentioned above. For calibration, the ((tsn-T2)+((T1-trn)) fingerprint values are obtained in the several measurements. The average fingerprint value (FPavg), minimum fingerprint value (FPmin) and maximum fingerprint value (FPmax) may be stored for future use. FPavg, FPmin and/or FPmax may be used later to verify that the fingerprint of a nomadic device used in conjunction with the vehicle is within acceptable limits and whether the nomadic device can be considered legitimate.

In an example, the software application of present disclosure in its code can use clock( )function which is available in time.h. It can call the clock function at the beginning and end of the code for which T1 and T2 are measured and T2 and T1 may be subtracted to get processor time, like following. It needs be appreciated that other codes can also be written for the software application to be installed on the nomadic device to obtain T1, T2 or T2-T1.

```
#include <time.h>
clock t start, end;
double cpu_time_used;
start=clock( )
/*Do the work. */end
=clock( )
cpu_time_used=((double)      (end−start))/CLOCKS_PER_SEC;
```

In an example, time of flight and distance may be determined by the nomadic device by executing the software application 31, and the RTT observed at the vehicle. In this example, the calculated RTT at the vehicle is broadcasts back to the nomadic device. Thus, the software application may comprise computer program code that when executed by one or more processors of the nomadic device performs a method comprising calculating time-of-flight at least partially in response to the generated first and second timestamps.

In an example, the software application comprises computer program code that when executed by one or more processors of the nomadic device transmits the generated first and second timestamps to the one or more component of the mobile device, wherein the time-of-flight is calculated external to the mobile software application by one or more components of the mobile device, for example, by ToF module of the mobile device.

Optionally, the software application comprises computer program code that when executed by one or more processors of the nomadic device transmits a request to receive a time value corresponding to when the short-range wireless communication signal is received by the short-range wireless communication system of the mobile device, and receives a response indicating the time value corresponding to when the short-range wireless communication signal is received by the short-range wireless communication system of the mobile device.

As shown in FIG. 3, in one example, the generated first timestamp (T1) has a different time value than the time value corresponding to when the short-range wireless communication signal is received by the short-range wireless communication system of the nomadic device (Trn). Further, optionally, the generated second timestamp (T2) has a different time value than a time value corresponding to when the short-range wireless communication system of the nomadic device transmits the short-range wireless communication signal (Tsn).

In an embodiment, the software application comprises computer program code that when executed by one or more processors of the nomadic device determines a distance of the nomadic device to the vehicle based on the calculated time-of-flight at least partially in response to the generated first and second timestamps, for example, based on the following formula: d=c*((RTT−T delay)/2) or d=c*((RTT−T latency)/2), the latter being more accurate as it takes into consideration time consumed by SRWCS 304 and hardware and software components 305.

Optionally, the software application 31 comprises computer program code that when executed by one or more processors of the nomadic device generates a notification, when the calculated time of flight exceeds a predetermined threshold. The notification may comprise a verification request. For example, when the vehicle does not recognize the nomadic device within an allowed tolerance time window, it triggers a verification request such as Single-Factor Authentication request (SFA) on the nomadic device. In this case, the user needs to click a button on the nomadic device interface (e.g. touch screen display). If the SFA pops up when the user is not near the vehicle, this is an indicator that a relay attack has been attempted. When the user accepts the operation, the vehicle can conclude that the new delay is normal and may update the typical delay stored in its memory to update the calibration results, or trigger a new calibration procedure.

A nomadic device may be enabled to control a passive entry-passive start system of a vehicle. An executable software application may be installed on the nomadic device which allows it to control a passive entry-passive start system installed in a vehicles and allows users to perform vehicle functions. The nomadic device may be capable of locking and unlocking doors. The nomadic device may be capable of engaging a remote ignition system of a motorized vehicle. The nomadic device interface may allow the user to interact with an vehicle's computing platform (a controller) to manipulate other functions of vehicle.

The software application of present disclosure can be installed, for example, from the Apple App Store, Galaxy store, Microsoft store, clouds, and/or third party providers. Optionally, the software application can be installed on a nomadic device via USB stick, internet connected backend and/or cloud.

Many keyless systems communicate over the Industrial, Scientific and Medical (ISM) radio bands. In one embodiment of the present disclosure, the executable software application is loaded onto a nomadic device such as smart phone which allows it to interface and communicate with an existing keyless system of the vehicle. For example, a mobile device such as smart phone replaces a remote controller or key fob that originally came with the vehicle's keyless system.

Optionally, the executable software application comprises a number of virtual toggle switches and slide bars which allow the user to perform various functions of a vehicle. For example, a menu screen and interface is displayed by an executable program loaded onto a nomadic device such as smart phone which is designed to control the electronic functions of an automobile through its controller.

In another embodiment, an executable software application is loaded onto a nomadic device such as smart phone that allows it to function as a passive controller. In this embodiment, a passive entry-passive start system on a vehicle will detect the presence of the nomadic device using, for example, a short-range wireless communication protocol (e.g. BLE protocol). The nomadic device having the executable software application of the present disclosure identifies the nomadic device owner as a person authorized to access the system. For example, when a passive entry-passive start system on a vehicle recognizes a nomadic device through at least the first time stamp (T1) and the second time stamp (T2) or the software application delay time (t delay, T2-T1), the passive system on the vehicle will unlock the door.

Typically, before being usable as nomadic device for the unlockable device, the nomadic device, e.g. smart phone, and the unlockable device, e.g. vehicle, must be paired during an initialization phase. Some protocols such as BLE already include this capability.

Otherwise, the user may need to have an ID and an asymmetric key pair (both in the car and in the phone). The smart phone will then have to authenticate itself towards the car (using its private key) in order to gain access.

The nomadic device such as smart phone may be loaded with an executable software application that allows the nomadic device to act as a passive ignition key. The executable software application and a passive entry-passive start system on a vehicle may be designed to only allow the vehicle's ignition be started if the vehicle recognizes a nomadic device through at least the first time stamp (T1) and the second time stamp (T2) or the software application delay time (t delay, T2-T1).

Figure 4:
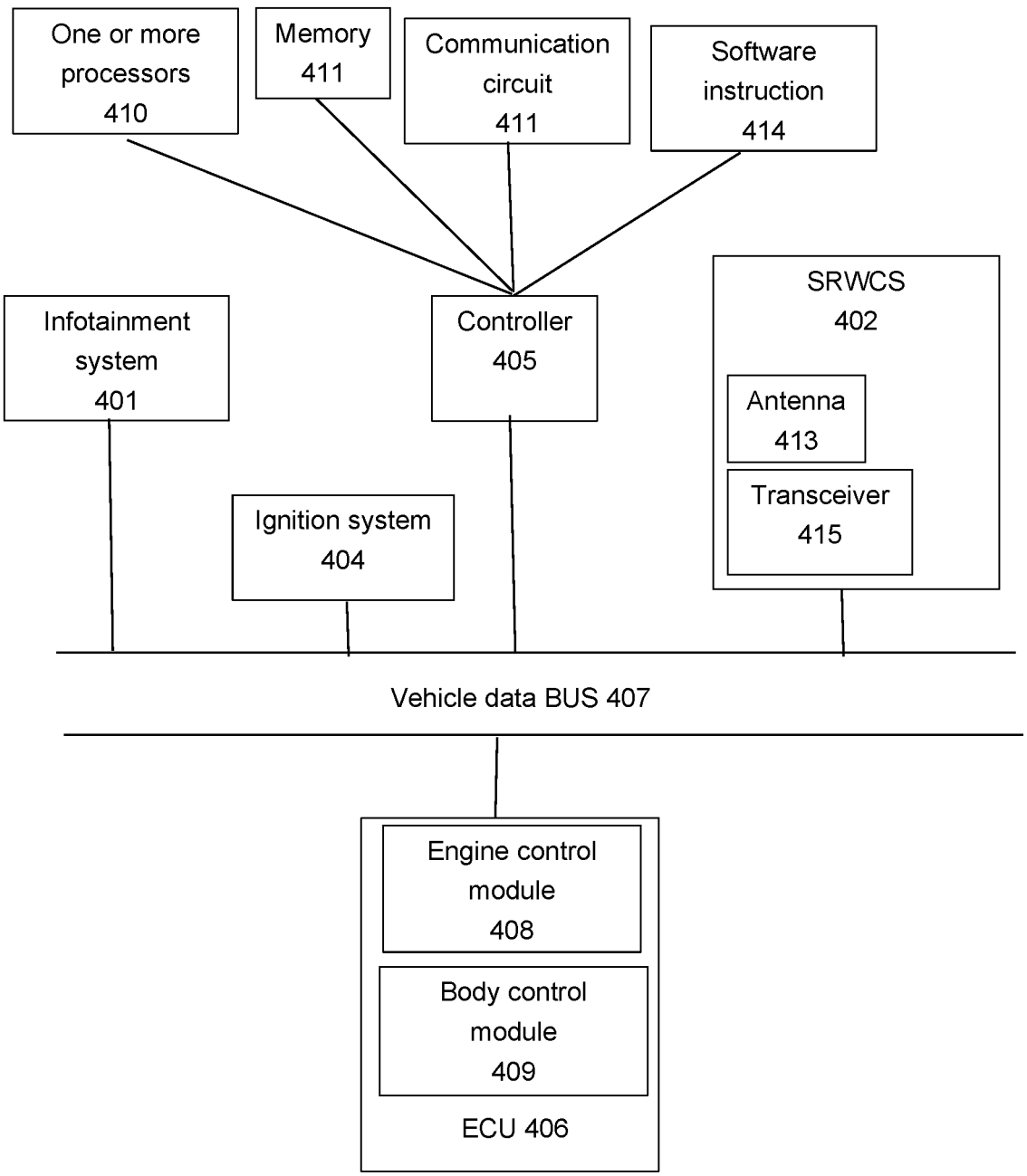
FIG. 4 illustrates an exemplary vehicle's electronic components in accordance with an embodiment of present disclosure.

FIG. 4 is a block diagram of electronic components 400 of an example vehicle. The electronic components include but are not limited to a vehicle infotainment system 401, a short-range wireless communication system (SRWCS) 402

(e.g. BLE subsystem), an ignition switch 404, and a controller 405 which is a computing platform of the vehicle, electronic control units (ECU) 406. These and possibly other components may be coupled to one or more network connections 407 (e.g., a vehicle data BUS). In addition, at least one controller 405 may be part of a vehicle infotainment system 401, or part of the communication module 402 or part of the short-range wireless communication subsystem 402 (e.g., a vehicle BLE subsystem) which is used to carry out at least a portion of the method described herein.

Vehicle infotainment system 401 may comprise a user interface and display and may be used to provide a number of vehicle services to users of the vehicle (e.g., non-limiting examples include audio data, video data, multi-media data). The short-range wireless communication system 403 and/or the controller may be part of the infotainment system (not illustrated in FIG. 4).

The controller 405 may be any suitable hardware module in the vehicle configured to perform one or more different vehicle functions according to the present disclosure. The controller can have one or more processors (410), memory devices (411), communication circuit (412), antenna (413), transceivers (415), and operational software instructions (414) which may be embodied as software programs, firmware programs, or the like. Optionally, the SRWCS 402 can be part of the controller 405.

The SRWCS 402 may enable the vehicle 3 to perform communication over short range wireless communication protocol (e.g. BLE) with the nomadic device. The processor 410 can be any type of device capable of processing electronic instructions including microprocessors, microcontrollers, and vehicle communication processors.

Short-range wireless communication system 402 can comprise any suitable components such as transceivers 415 and antennas 413 for communicating with the nomadic device over a short-range wireless communication protocol. In at least one example (and as described hereafter), the short-range wireless communication system 403 is a BLE system and utilizes the Bluetooth® Low Energy (BLE) protocol.

Non-limiting examples of ECU 406 include: an engine control module (ECM) 408 that controls various aspects of engine operation such as engine power ON/OFF; and a body control module (BCM) 409 that controls various electrical components located throughout the vehicle, such as vehicle's power door locks.

One or more Processors 410 may execute software instruction 414, which may be stored in memory device 411 and enable the ECUs such as BCM 409 and ECM 408 to perform one or more vehicle functions, e.g. to actuate vehicle ignition (power ON or power OFF), to actuate vehicle door locks (lock or unlock). The software instruction can, for example, be part of the system software installed when operating system is installed or can, for example, be a software application downloaded by the vehicle system from an external source such as via USB stick, internet connected backend and/or cloud.

The executable software instruction 414 may be loaded onto the memory device 411 of the controller 405 which allows it to interface and communicate with an existing keyless system of the vehicle.

Optionally, the software instruction installed on a vehicle determines the distance based on, at least, software application processing delay (T delay) through use of the first and the second time stamps, and RTT to obtain the distance d.

The memory 411 may include any non-transitory computer usable or readable medium, which include one or more storage devices or articles. The term "non-transitory computer-readable medium" as used in present disclosure refers to any medium that comprises the actual performance of an operation (such as hardware circuits), that comprises programs and/or instructions to be provided to one or more processors for performance/implementation (such as instructions stored in a non-transitory memory), and/or that comprises instructions stored in memory. Non-transitory computer-readable media may take many forms, such as non-volatile and volatile media, including but not limited to, a floppy disk, flexible disk, hard disk, conventional computer system RAM (random access memory), ROM (read only memory), EPROM (erasable, programmable ROM), EEPROM (electrically erasable, programmable ROM), and magnetic or optical disks or tapes, any memory chip, a CD-ROM, DVD, or any other optical medium from which a computer instruction can be read, or any other non-transitory medium from which a computer instruction can be read.

In one embodiment, the non-transitory computer-readable storage medium that stores instructions for execution by the one or more processors to receive a wireless signal at a short-range wireless communication system on a vehicle from a nomadic device, wherein the received wireless signal comprising a first timestamp, generated by a software application of the nomadic device, corresponding to a time value based on a short-range wireless communication signal that reaches a nomadic device software application; a second timestamp, generated by the software application of the nomadic device, corresponding to a time when the software application transmits the short-range wireless communication signal to one or more component of the nomadic device; determining a distance between a vehicle and a nomadic device communicatively coupled to the vehicle based upon a time-of-flight of the short-range wireless communication signal between the nomadic device and the vehicle, wherein the time-of-flight is measured at least partially in response to the generated first and second timestamps; and causing a vehicle module (e.g. ECU including ECM and BCM) to perform a vehicle function based on the determined distance.

For example, the vehicle function includes at least a vehicle ignition actuation, a vehicle door lock actuation, a vehicle door unlock actuation, or a vehicle alarm actuation.

Optionally, the instruction when executed by the one or more processors of the controller performs a method, comprising: receiving access entry to the vehicle, allowing entry or preventing entry into the vehicle by unlocking doors or maintaining a locked state of the doors, respectively, based on comparing the determined distance with a predetermined distance threshold.

Optionally, wherein the instruction when executed by the one or more processors of the controller performs a method, comprising receiving ignition request for the engine, starting or preventing ignition of the engine based on comparing the determined distance with a predetermined distance threshold.

In an embodiment, the instruction when executed by the one or more processors the controller performs a method, comprising sending and receiving short-range wireless communication signals, identifying a time value when the signal is sent to a nomadic device and a time when the signal is received from the nomadic device.

In an embodiment, the instruction when executed by the one or more processors the controller performs a method, comprising transmitting a request to receive the first time stamp and the second time stamp.

In an embodiment, the instruction when executed by the one or more processors determines whether the calculated distance exceeds a predetermined distance threshold, generating a notification, when the calculated distance exceeds a predetermined threshold. Optionally, the notification comprises a verification request.

In another aspect of present disclosure, a further method to perform a vehicle function based upon a time-of-flight of the short-range wireless communication signal between the nomadic device and the vehicle is provided. In one embodiment, the method comprises receiving a wireless signal at the short-range communication system from the nomadic device, wherein the received wireless signal comprises: a first timestamp corresponding to a time value based on a short-range wireless communication signal that reaches a nomadic device software application, a second timestamp corresponding to a time when the nomadic device software application transmits the short-range wireless communication signal to one or more component of the nomadic device, measuring time-of-flight of the short-range wireless communication signal between the nomadic device and the vehicle, at least partially in response to the generated first and second timestamps. The method further comprises determining a distance between a vehicle and a nomadic device communicatively coupled to the vehicle based upon the measured time-of-flight of the short-range wireless communication signal between the nomadic device and the vehicle. Based on the measured distance, the method performs a vehicle function based on the determined distance according to the present disclosure.

Figure 5:
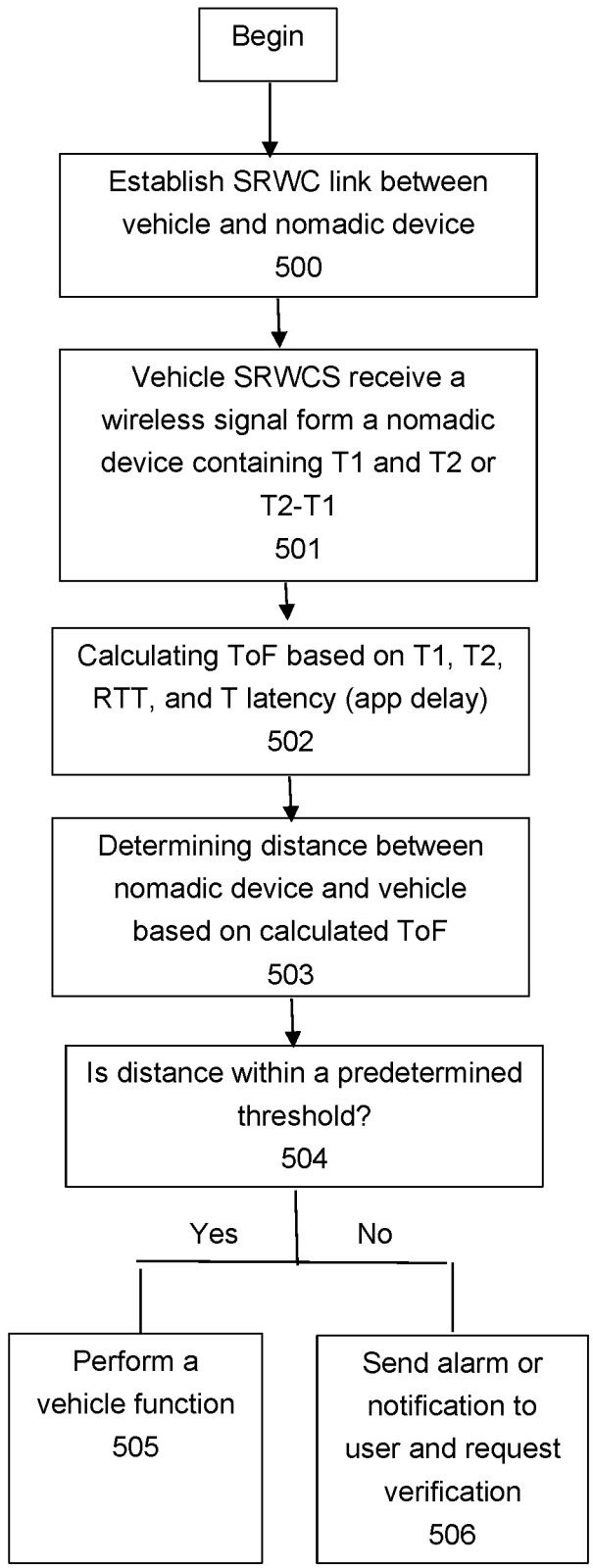
FIG. 5 is a flowchart of an exemplary method in accordance with an embodiment of present disclosure.

Referring to FIG. 5, a further exemplary method begins with step 500 in which a short range wireless communication link (e.g., a BLE link) is established between the BLE system and mobile device. In at least one implementation, the pairing of BLE system and wireless device occurs seamlessly; e.g., the BLE system and mobile device may be previously paired (e.g., in accordance with security protocols and techniques known to skilled artisans) so that when the mobile device is in the presence or proximity of BLE system, the pairing occurs automatically. During any previous pairing, mobile device may identify itself by providing a mobile device parameter—e.g., an identifier of the device to the vehicle (e.g., a mobile identification number). At step 501, vehicle short-range wireless communication system such as BLE system receives a wireless signal comprising a first time stamp T1, a second time stamp T2, or a processing delay T delay (T2-T1) from a nomadic device. At step 502, ToF is calculated, by one or more vehicle modules such as ToF module, based on T1, T2 or T2-T1 to obtain a true ToF. Step 503 follows by calculating the distance between the nomadic device and the vehicle. Thereafter, the calculated distance is compared with a predetermined distance threshold (step 504). When the calculated distance is within the threshold, a vehicle function such as lock/unlock doors, ignition power ON/OFF is performed (step 505). As shown in step 506, when the calculated distance is outside the threshold, a vehicle function such as preventing access entry or start ignition is performed and optionally and alarm is sent to user's nomadic device requesting user's verification.

Figure 6:
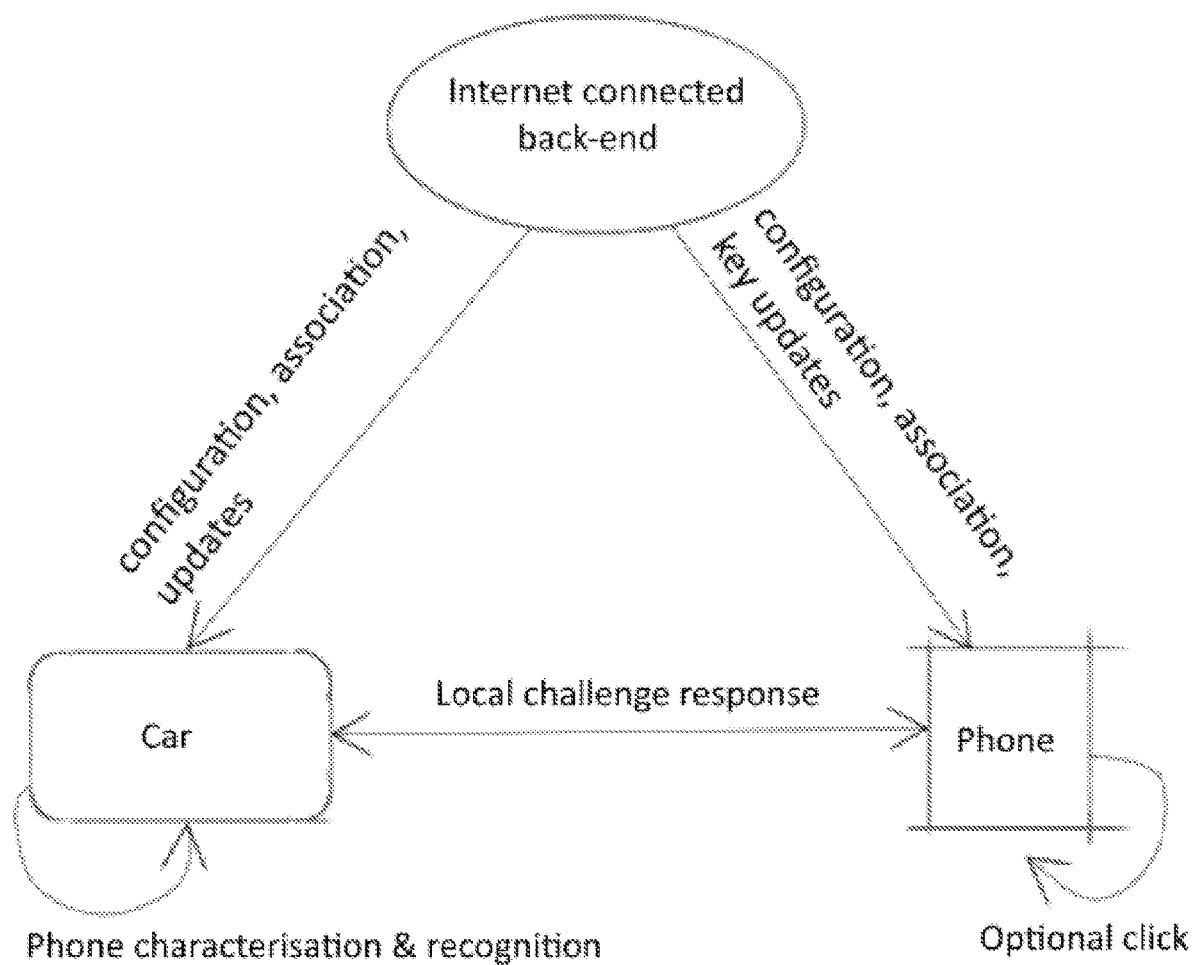
FIG. 6 illustrates an exemplary passive entry-passive start system in accordance with an embodiment of the present disclosure.

As another example, referring to FIG. 6, during the initial setup phase, both vehicle (e.g. passenger car) and nomadic device (e.g. smart phone) register to a back-end. Well known techniques are used in the vehicle (TPM chip) and in the nomadic device (regularly updated white box cryptography & obfuscation) to authenticate and identify car and phone, so that they can be associated to the same end user. During a second setup phase, the vehicle and the nomadic device locally exchange information using short-range wireless communication such as BLE. The vehicle uses its short-range wireless communication chip such as BLE chip, interfaced at low level, to characterize the transceiver in the mobile device.

As explained above, the present disclosure identifies the typical delay induced by the processing of a specific nomadic device (e.g. smart phone or smart watch) with its specific configuration to be able to accurately measure the round-trip Time of Flight and thus its distance to the vehicle. This phase may last a few seconds.

From there, whenever the vehicle detects a nomadic device within reach, it exchanges with it high level cryptographic messages to determine if this phone is authorized to open/start the vehicle, using well-known local authentication techniques (protected by the technologies mentioned above to protect secret information). In parallel, the vehicle analyses the signal at a low level to recognize the phone through ToF measurement, taking into account the typical delay measured during the setup phase. If the car does not recognize the phone within an allowed tolerance time window, it triggers a verification request such as Single-Factor Authentication request (SFA) on the phone: the user needs to click a button on the mobile interface. If the SFA pops up when the user is not near the vehicle, this is an indicator that a replay attack has been attempted. If the user is close to the vehicle when this happens, it means that the delay induced by the nomadic device is out of the tolerated time window. If the user accepts the operation, the vehicle can conclude that the new delay is normal and update the typical delay stored in its memory.

As the OS version installed on the nomadic device such as smart phone and the number of software applications evolve over time, a drift in the delay value is to be expected but this drift is likely to be small and within the tolerated time window. The vehicle can therefore keep track of the past delay values and adapt the typical delay accordingly without requiring the use of a SFA pop up on the phone. This mechanism is meant to provide a better user experience and measure more accurate distance.

To secure a system against relay attacks, present disclosure keeps delay tolerance as low as possible. The time jitter is for a great part coming from the software application processing on the nomadic device such as mobile phone, but this is something that present disclosure according to the preceding embodiments measures. For example, The BLE system of the nomadic device will trigger a callback (software interrupt) within the software application when a BLE frame comes in and takes a timestamp T1 when this happens. When the software application is done with its processing, it takes a timestamp T2 just before sending the reply BLE frame. The delay induced by the software application or AppDelay or T delay can therefore be computed as T2-T1 and sent securely to the vehicle so that it can be deducted from the ToF measurement. With this method, the jitter is kept at a minimum and only depends on the BLE system and not on the application processing (incl. other software applications and services that run in parallel).

In another aspect of present disclosure a passive entry-passive start vehicle security system is provided. All previous paragraphs relating to the nomadic device, vehicle, software applications installed on the nomadic device, software instructions installed on the vehicle, vehicle controller, first and second time stamps, software application processing delay, nomadic device processing latency, measurements of distance, i.e. all preceding embodiment are incorporated by reference in their entirety in the passive entry passive start vehicle security system of present disclosure.

For example, said system comprises a first short-wave wireless communication signal transceiver (e.g. Bluetooth® low energy (BLE)) installed on a vehicle and configured to transmit a request signal at a time, a second short-wave wireless communication signal transceiver (e.g. mobile BLE transceiver) installed in a nomadic device and configured to transmit a reply signal in response to the request signal, wherein the reply signal comprises a first timestamp, generated by a software application of the nomadic device, corresponding to a time value based on a short-range wireless communication signal that reaches a nomadic device software application and a second timestamp, generated by the software application of the nomadic device, corresponding to a time when the software application transmits the short-range wireless communication signal to one or more component of the nomadic device. The system further includes a controller configured to determine a distance between the first transceiver and the nomadic device transceiver, via one or more processors, based upon a time-of-flight of the short-range wireless communication signal between the nomadic device and the vehicle, wherein time-of-flight is determined at least partially in response to the generated first and second timestamps.

Optionally, the system includes a vehicle ECU that based upon determination of the distance as calculated above controls other electronic functions of the vehicle such as doors lock/unlock and power ignition ON/OFF. Naturally, the system of present disclosure can other components of the nomadic device and vehicle as shown in FIGS. 2-4.

The detailed description set-forth above is provided to aid those skilled in the art in practicing the present disclosure. However, the disclosure described and claimed herein is not to be limited in scope by the specific embodiments herein disclosed because these embodiments are intended as illustration of several aspects of the disclosure. The embodiments set-forth above can be performed and combined with other disclosed embodiments according to the disclosure. Any equivalent embodiments are intended to be within the scope of this disclosure. Indeed, various modifications of the disclosure in addition to those shown and described herein will become apparent to those skilled in the art from the foregoing description which do not depart from the spirit or scope of the present disclosure discovery. Such modifications are also intended to fall within the scope of the appended claims. All publications, patents, patent applications and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

What is claimed is:

1. A non-transitory computer-readable storage medium that stores instructions for execution by the one or more processors to perform a method comprising:
    receiving a wireless signal at a short-range wireless communication system on an unlockable device, such as a vehicle, from a nomadic device, wherein the received wireless signal comprises time information, the time information comprising one or more of:
        a first timestamp corresponding to a time value generated based on a short-range wireless communication signal that reaches a software application of the nomadic device, and a second timestamp corresponding to a time value generated when the software application transmits the short-range wireless communication signal to one or more component of the nomadic device; or
        a time value corresponding to a software application processing delay obtained at least partially from subtracting the second timestamp from the first timestamp;
    determining time-of-flight of the short-range wireless communication signal between the nomadic device and the unlockable device at least partially in response to the received first and second timestamps or the software application processing delay;
    causing an unlockable device module to perform an unlockable device function based on the determined time-of-flight.

2. The non-transitory computer-readable storage medium according to claim 1, wherein the method further comprises:
    determining a distance between the unlockable device and the nomadic device based upon the determined distance, and wherein causing the unlockable device module to perform the unlockable device function based on the determined distance.

3. The non-transitory computer-readable storage medium according to claim 1, wherein the time-of-flight is determined at least, partially in response to a time value corresponding to a nomadic device processing latency.

4. The non-transitory computer-readable storage medium according to claim 1, wherein the time-of-flight is determined at least partially in response to:
    a time value corresponding to the nomadic device processing latency; and
    a round trip time corresponding to a time when the short-range wireless communication signal is transmitted from the vehicle to the nomadic device and a time when the signal is received from the nomadic device.

5. The non-transitory computer-readable storage medium according to claim 1, wherein the method further comprises:
    determining whether the calculated time-of-flight exceeds a predetermined threshold, generating a notification based on the calculated distance exceeding a predetermined threshold.

6. The non-transitory computer-readable storage medium according to claim 1, wherein the unlockable device is a vehicle, and wherein the unlockable device function comprises a vehicle function including at least one of the following: a vehicle ignition actuation; a vehicle door lock actuation; or a vehicle door unlock actuation.

7. The non-transitory computer-readable storage medium according to claim 1, wherein the unlockable device is a vehicle, and wherein the method further comprises:
    receiving ignition request for the engine;
    starting or preventing ignition of the engine based on comparing the determined distance with a predetermined distance threshold.

8. The non-transitory computer-readable storage medium according to claim 6, wherein the unlockable device module is an electronic control unit (ECU).

9. The non-transitory computer-readable storage medium according to claim 1, wherein the method further comprises:
    receiving access entry request to the unlockable device;
    allowing entry or preventing entry into the unlockable device by unlocking doors or maintaining a locked state of the doors, respectively, based on comparing the determined distance with a predetermined distance threshold.

10. An unlockable device comprising:
one or more short-range wireless communication system, wherein at least one communication system is for short-range wireless protocol communication;
a controller comprising one or more processors; and
and a non-transitory computer-readable storage medium that stores instructions for execution by the one or more processors, the non-transitory computer-readable storage medium according to claim 1.

11. The unlockable device according to claim 10, wherein the unlockable device is a vehicle.

12. A controller, comprising:
one or more processors; and
a non-transitory computer-readable storage medium that stores instructions for execution by the one or more processors, the non-transitory computer-readable storage medium according to claim 1.

13. A non-transitory computer-readable storage medium that stores instructions for execution by the one or more processors to perform a method comprising:
generating time information, the time information comprising one or more of:
a first timestamp corresponding to a time value generated based on a short-range wireless communication signal that reaches a software application of the nomadic device, and a second timestamp corresponding to a time value generated when the software application transmits the short-range wireless communication signal to one or more component of the nomadic device; or
a time value corresponding to a software application processing delay obtained at least partially from subtracting the second timestamp from the first timestamp.

14. The non-transitory computer-readable storage medium according to claim 13, wherein the method further comprises:
transmitting a further short-range wireless communication signal from the nomadic device to an unlockable device, such as a vehicle, wherein further short-range wireless communication signal comprises the time information.

15. A nomadic device, comprising:
one or more processors;
memory, operatively coupled to the one or more processors;
a short-range wireless communication system, operatively coupled to the one or more processors; and
a non-transitory computer-readable storage medium that stores instructions for execution by the one or more processors, the non-transitory computer-readable storage medium according to claim 13.

16. A system, comprising:
a first short-wave wireless communication signal transceiver installed in an unlockable device, such as a vehicle, and configured to transmit a request signal at a time;
a second short-wave wireless communication signal transceiver installed in a nomadic device and configured to transmit a reply signal in response to the request signal;
a controller comprising one or more processors; and
a non-transitory computer-readable storage medium that stores instructions for execution by the one or more processors, the non-transitory computer-readable storage medium according to claim 1,
wherein the reply signal comprises time information, the time information comprising one or more of:
a first timestamp corresponding to a time value generated based on a short-range wireless communication signal that reaches a software application of the nomadic device, and a second timestamp corresponding to a time value generated when the software application transmits the short-range wireless communication signal to one or more component of the nomadic device; or
a time value corresponding to a software application processing delay obtained at least partially from subtracting the second timestamp from the first timestamp.

17. A method comprising:
establishing a short-range wireless communication link between a short-range communication system on an unlockable device, such as a vehicle, and a nomadic device;
receiving a wireless signal at a short-range wireless communication system on the unlockable device from the nomadic device, wherein the received wireless signal comprises time information, the time information comprising one or more of:
a first timestamp corresponding to a time value generated based on a short-range wireless communication signal that reaches a software application of the nomadic device, and a second timestamp corresponding to a time value generated when the software application transmits the short-range wireless communication signal to one or more component of the nomadic device; or
a time value corresponding to a software application processing delay obtained at least partially from subtracting the second timestamp from the first timestamp;
determining time-of-flight of the short-range wireless communication signal between the nomadic device and the unlockable device at least partially in response to the received first and second timestamps or the software application processing delay;
perform an unlockable device function based on the determined time-of-flight.

18. The method according to claim 17, wherein the method further comprises:
determining a distance between the unlockable device and the nomadic device based upon the determined distance, and wherein causing the unlockable device module to perform the unlockable device function based on the determined distance.

\* \* \* \* \*